Figure 1:
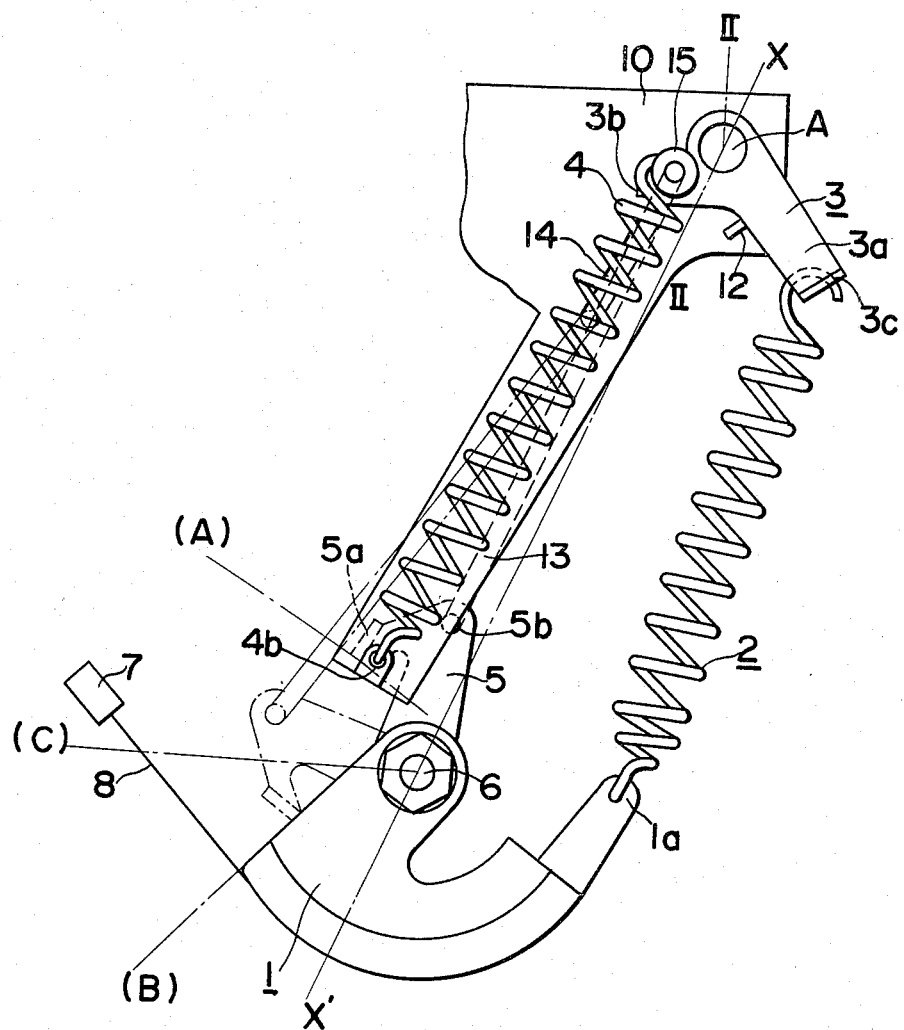

United States Patent
Akagi

[11] 3,910,134
[45] Oct. 7, 1975

[54] CARBURETOR THROTTLE VALVE SAFETY DEVICE
[75] Inventor: Toshimichi Akagi, Hiroshima, Japan
[73] Assignee: Toyo Kogyo Co., Ltd., Japan
[22] Filed: Sept. 26, 1973
[21] Appl. No.: 400,815

[30] Foreign Application Priority Data
Sept. 30, 1972 Japan............................ 47-113746

[52] U.S. Cl.................................. 74/513; 123/198
[51] Int. Cl.............................................. G05g 1/14
[58] Field of Search ........... 74/513, 102; 123/198 D

[56] References Cited
UNITED STATES PATENTS

| | | |
|---|---|---|
| 2,927,476 | 3/1960 | Hutzenlaub............................ 74/513 |
| 3,020,508 | 2/1962 | Zhehlke et al........................ 74/102 |
| 3,273,552 | 9/1966 | Plath............................. 123/198 D |
| 3,698,372 | 10/1972 | Eshelman........................ 123/198 D |

FOREIGN PATENTS OR APPLICATIONS

| | | |
|---|---|---|
| 496,100 | 11/1938 | United Kingdom............. 123/198 D |
| 204,194 | 8/1954 | Australia........................ 123/198 D |

Primary Examiner—Samuel Scott
Assistant Examiner—Wesley S. Ratliff, Jr.
Attorney, Agent, or Firm—Wenderoth, Lind & Ponack

[57] ABSTRACT

A safety device for controlling a carburetor throttle valve in a wire type accelerator system which comprises a throttle lever, a main return spring, a spring attaching lever, an auxiliary throttle lever and an auxiliary return spring, in which the auxiliary return spring connected between the spring attaching lever and the auxiliary throttle lever controls the throttle valve positions through a connecting rod in case of a failure of the main return spring.

3 Claims, 6 Drawing Figures

CARBURETOR THROTTLE VALVE SAFETY DEVICE

This invention relates to a safety device and, more particularly, to a safety controlling device of a carburetor throttle valve of an automotive vehicle, wherein the throttle valve is adapted to close upon release of the acceleration pedal even when the main throttle return spring is broken.

According to a conventional accelerator system using a wire, a throttle valve is closed by turning the throttle lever to a closed position by means of a return spring connected between said lever and a suitable fixing point, retracting the wire when an acceleration pedal is released. However, should the return spring be broken, the throttle lever cannot be turned to close the throttle valve with the wire sagging between the lever and the acceleration pedal, which may result in the car running recklessly due to overrunning of an engine. For this reason, a safety device provided with 2 return springs for the carburetor, that of a link type accelerator control system or that of dual system return spring mechanism employing coil springs have been proposed, but the above devices have such defects that the first one requires the force in depressing the acceleration pedal to be more than twice that of a single spring device.

Furthermore, the 2 springs employed therein may break simultaneously as they are always used at the same time and could wear out to the same extent. On the contrary, even when only 1 of the 2 springs is broken, the throttle lever can be turned to the fully opened position of the throttle valve by the remaining 1 spring, if the acceleration pedal is depressed, which is dangerous with the driver unaware of the failure.

The second one needs a larger space with resultant high cost, and the third one results in a smaller torque on the throttle shaft.

Accordingly, an essential object of the present invention is to provide a safety device for controlling a carburetor throttle valve which overcomes the defects inherent in conventional safety devices.

Another important object of the present invention is to provide a safety device for controlling a carburetor throttle valve with simple construction and low cost.

A further object of the present invention is to provide a safety device of the above described type which is provided with a main return spring and an auxiliary return spring wherein the auxiliary return spring controls the throttle valve in case the main return spring is broken with substantial elimination of malfunctioning of the safety device and subsequent risk of the car running recklessly.

According to a preferred embodiment of the present invention, one end of a main return spring is fixed to a throttle lever, while the other end is fixed to a spring attaching lever rotatably attached by means of a pin to a carburator, the clockwise rotation of the spring attaching lever being limited by a stopper. The throttle lever is thus kept at a fully closed position by the inward pull of the main return spring which is in a state of expansion. There is also provided a connecting rod, the lower end of which is rotatably attached to an auxiliary throttle lever which is rotatably mounted an the throttle lever shaft, while the upper end is bent at right angles to the axis of the rod and placed on a projection of a spring attaching lever. An auxiliary return spring with the upper end hung on the bent tip of the connecting rod and the lower end fixed to a bracket gives a downward pull to the connecting rod. Should the main return spring be broken, the bent tip of the rod slips off the projection of the spring attaching lever, and consequently the auxiliary throttle lever which is rotatably connected at the lower end of the rod turns counterclockwise, pushing the throttle lever around up to the fully closed position of the throttle valve.

Figure 2:
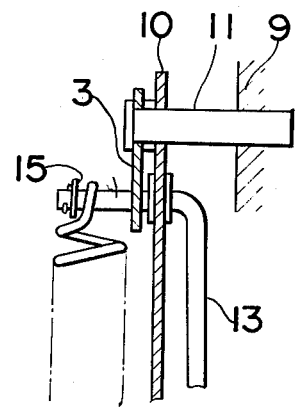
Figure 3:
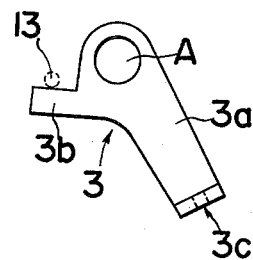
Figure 4:
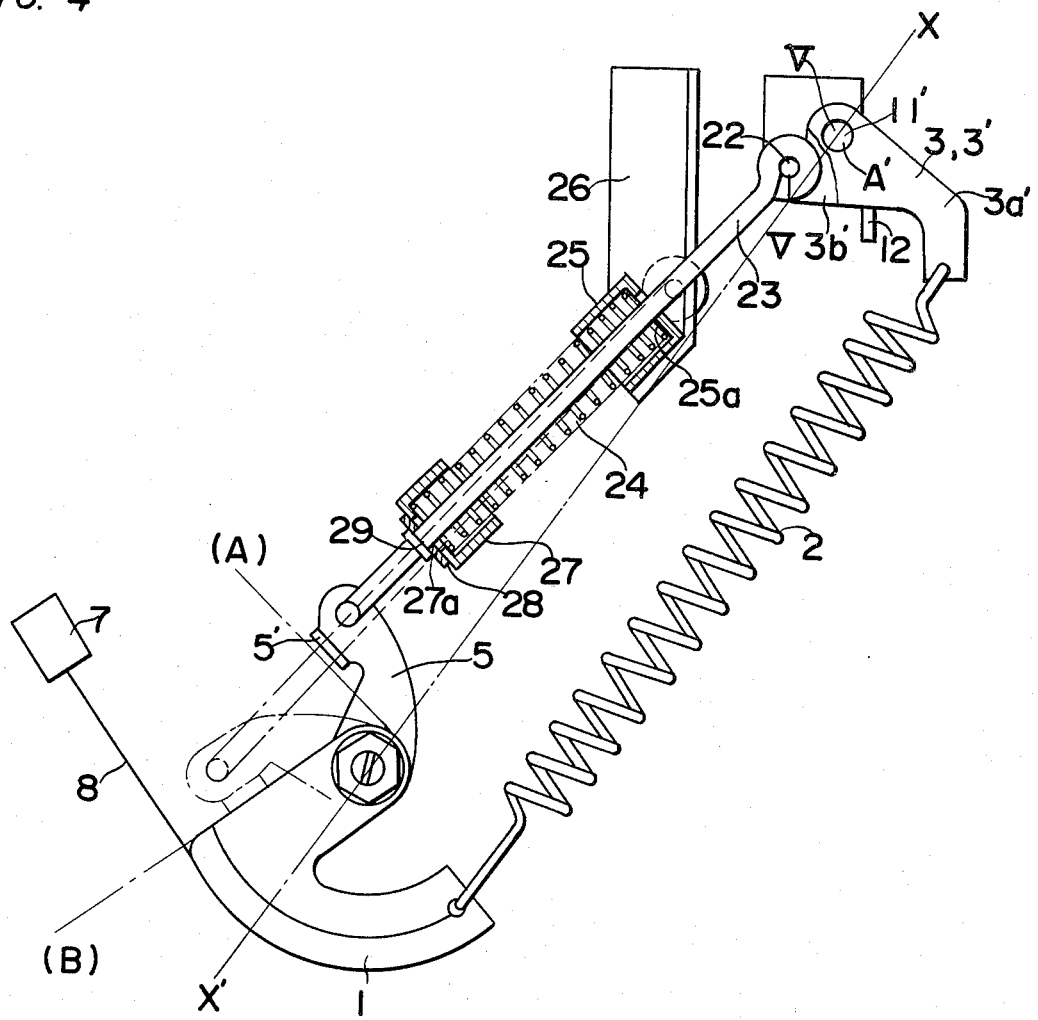
Figure 5:
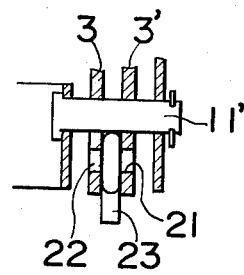
Figure 6:
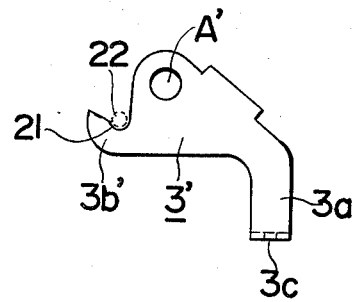

These and other objects and features of the present invention will become apparent from the following description taken in conjunction with the preferred embodiments thereof with reference to the accompanying drawings, in which;

FIG. 1 is a schematic diagram showing one preferred embodiment of a carburetor throttle valve safety device in accordance with the present invention, FIG. 2 is a cross sectional view taken along the line II—II in FIG. 1, FIG. 3 is a plan view of a spring attaching lever, FIG. 4 is a schematic diagram showing another preferred embodiment of a carburetor throttle valve safety device, FIG. 5 is a cross sectional view taken along the line V—V in FIG. 4, and FIG. 6 is a plan view of a spring attaching lever.

Referring now to FIGS. 1, 2 and 3, the carburetor throttles valve safety device generally comprises a throttle lever 1 connected to a carburetor throttle valve ( not shown ) by means of a throttle shaft 6, a main return spring 2, a spring attaching lever 3, an auxiliary return spring 4, a connecting rod 13 and an auxiliary throttle lever 5, constituting a link mechanism.

The sector-shaped throttle lever 1 having a hole 1a is at one end rigidly fixed to the throttle shaft 6 which rotates integrally with the throttle valve ( not shown) in the air horn of a carburetor and is also connected to an accelerator pedal 7 by means of a wire 8. When the accelerator pedal 7 is up, that is, when not depressed, the throttle lever 1 is down in the closed position (B), and when the pedal 7 is down, that is, when depressed, the lever 1 turns by approximately 90° up to the opened position (A) in a known manner as shown by the chain line.

The spring attaching lever 3 with a center hole A is provided with a large projection 3a at one end and a smaller projection 3b at the other, and is rotatably attached by means of a pin 11 through the hole A to a bracket 10 mentioned later which is rigidly fixed to the outside of a carburetor 9. The tip of the projection 3a is bent at right angles with a small hole 3c formed therein to attach one end of the main return spring 2, while the upper edge of the projection 3b is approximately horizontal to receive one end of a connecting rod 13 which will be referred to later. As the projection 3a has more weight than the projection 3b in respect of the center A, the former tends to turn clockwise with A as a center, the lower edge contacting a stopper 12 rigidly fixed on the bracket 10.

The main return spring 2 with hook shaped ends is connected between the hole 3c of the projection 3a and the hole 1a at one end of the throttle lever 1 in an expanded state, while the lower edge of the projection 3a contacts the stopper 12 when the main return spring 2 is normal. It should be noted here that the main spring 2 is positioned on the right of the center line X, X' in FIG. 1.

The auxiliary throttle lever 5 which is rotatably mounted on the throttle shaft 6 is provided with a hole 5b at one end to rotatably attach the lower end of a connecting rod 13 referred to later, and also a dent 5a positioned to come into contact with the throttle lever 1 in the closed position (B) upon the failure of the main spring 2.

The lower end of the connecting rod 13 is rotatably attached to the hole 5b of the auxiliary throttle lever 5 as mentioned above, while the upper end is bent at right angles to the axis thereof and mounted on the horizontal upper edge of the projection 3b of the lever 3 through a guide slot 14 in the bracket 10 mentioned below.

The bracket 10 is rigidly fixed to the outside of the carburetor 9, and has the guide slot 14 at the upper portion near the lower part of the pin 11 and a hole 4b to attach one end of the auxiliary return spring 4 at the lower end, the lower part of the bracket 10 being arranged not to hinder the free rotation of the auxiliary throttle lever 5 located below in the neighborhood.

The auxiliary return spring 4 is connected between the hole 4b of the bracket 10 and the bent end of the rod 13 in an expanded state, holding the bent end on the projection 3b with the lever 5 in the upper position shown by the full line. A retaining plate 15 is fixed at the extreme point of the bent tip to prvent the slipping off of the end of the spring 4. It is to be noted here that the auxiliary return spring 4 is positioned on the left of the center line X, X' on the surface of the bracket 10 with the rod 13 at the back thereof, and the upper edge of the projection 3b of the lever 3 crosses the upper part of the guide slot 14 at an angle, providing space for the bent end of the rod 13 to be held in between.

In the safety device according to the invention with the construction as hereinabove described, when the main return spring 2 is normal, the lower edge of the projection 3a of the lever 3 contacts the stopper 12 by the inward pull of the main return spring 2. In this state, if the acceleration pedal 7 is depressed, the throttle lever 1 rotates clockwise against the tension of the spring 2 up to the fully opened position of the throttle valve ( not shown ) as indicated by the chain line (A), the auxiliary return spring 4 having no effect on the force required for the acceleration pedal depression. In this case, as the auxiliary throttle lever 5 is connected to one end of the connecting rod 13 with the other end mounted on the projection 3b of the lever 3, it is kept in the upper position shown by the full line without interfering with the free rotation of the throttle lever 1.

On the other hand, when the acceleration pedal 7 is released, the throttle lever 1 returns by the tension of the main spring 2 to the fully closed position (B) as shown by the chain line.

It should be noted here that when the main return spring 2 is normal, the auxiliary return spring 4 has no effect upon the functioning of the safety device. That is, the spring 2 normally works independently of the auxiliary spring 4, and the spring 4 is in a stand-by condition as long as the main spring is normal, there being no possibility of failure or wearing out.

In cases where the main return spring 2 is broken, for example, by vibrations, losing the tension, the spring attaching lever 3 rotates counterclockwise with the pin 11 as a center by the tension of the auxiliary spring 4, and thus the bent tip of the connecting rod 13 mounted on the upper edge of the projection 3b slips off, moving downward along the guide slot 14, and stops at the lower part of the slot 14 as shown by the dotted lines. It is to be noted here that the spring 4 is still applying downward force to the rod 13 in this condition. Consequently, the auxiliary throttle lever 5 rotatably attached at the lower end of the rod 13 rotates counterclockwise down to the lower position shown by the chain line, pushing the throttle lever 1 forcibly with the dent 5a, bringing the lever 1 to the fully closed position (B) of the throttle valve ( not shown ). If the driver should press on the acceleration pedal 7 thereafter without knowing about the failure of the main return spring 2, the throttle lever 1 rotates clockwise, consequently turning the auxiliary throttle lever 5 and in turn moving the rod 13 upward, but due to the fact that the projection 3a of the lever 3 has more weight than the projection 3b in respect of the center A, and has returned to the position engaging the stopper 12, the bent tip of the rod 13 contacts the lower edge of the projection 3b without being able to ascend further, and therefore the throttle lever 1 can not be brought to the fully opened position (A), should the acceleration pedal 7 be depressed, whereby the driver immediately finds out about the failure through the resulting insufficient increase in the rate of revolutions of the engine.

It is to be noted here that, upon the failure of the main spring 2, the auxiliary spring works as intended, taking the place of the main spring 2 as described above, but that the throttle lever 1 is brought only up to the intermediate position C of the throttle lever upon depressing of the acceleration pedal 7. In other words, even upon the failure of the main spring 2, the automobile can be driven, but not at a full speed, which is desirable from the points of view of safety and warning of trouble to the driver.

Another embodiment of the invention shown in FIGS. 4, 5 and 6, differs from the first embodiment in the shapes of spring attaching levers 3, 3' and a connecting rod 23, and the method of attaching an auxiliary return spring 24 in which a pair of cup-shaped spring shoes 25, 27 are employed, while the throttle lever 1, the auxiliary throttle lever 5, the main return spring 2 and the linkage by wire 8 between the acceleration pedal 7 and the lever 1 are the same in function, thus the explanation of which is omitted hereunder.

The pair of spring attaching levers 3 and 3' with center holes A and A' respectively have the same inverted V shape each other and are provided with larger projections 3a and 3a' on one end and smaller projections 3b and 3b' on the other which a pair of identical dints 21 are formed to receive a pin 22 referred to later. The tip of the projection 3a' is bent at right angles with a small hole 3c formed thereon to receive one end of the main return spring 2. One end of the rod 23 is connected to the auxiliary throttle lever 5 while the hooked shaped other end is fixed to the pin 22 mounted in the dints 21 of the projection 3b, 3b'.

One of the spring shoes 27 is inserted into the rod 23 through a hole 27a in the bottom and fixed at the lower part of the rod 23 by a retaining plate 28 and a collar 29 formed on the rod 23, while the other shoe 25 is also inserted into the rod 23 through a hole 25a in the bottom and rigidly fixed to the bracket 26.

One end of the auxiliary return spring 24 is inserted into the lower spring shoe 27, while the other end is inserted into the upper spring shoes 25, thus surrounding the rod 23 in spaced relation between the two spring shoes. It is to be noted here that the spring 24 works here as a compression spring as in the first embodiment, applying downward force to the rod 23. It should also be noted that the main return spring 2 is positioned on the right and the auxiliary return spring 24 is on the left of the center line X–X'.

By this arrangement, in the normal state of the main return spring 2, the upper hook shaped end of the rod 23 is fixed to the pin 22 mounted on the dints 21 of the projection 3b, 3b' and therefore the auxiliary throttle lever 5 connected to the lower end of the rod 23 is in the upper position as shown by the full line with the spring 24 compressed between the spring shoes 25 and 27. When the main return spring 2 breaks, the spring 24 turns the lever 3, 3' counterclockwise, releasing the pin 22 together with the hook shaped end of the rod 23 from the dints 21, and the spring 24 pushes the rod 23 downward, thus turning the lever 5 to the closed position shown by the imaginary line with the dent 5' contacting the throttle lever 1.

When the main return spring 2 is normal, the lower edges of the projections 3a and 3a' contacts the stopper 12 by the inward pull of the main return spring 2. When the acceleration pedal 7 is depressed in this state, the throttle lever 1 is rotated from the closed position (B) to the opened position (A) in a manner similar to the first embodiment. In this case, as the auxiliary throttle lever 5 is connected to one end of the rod 23 with the other hook shaped end fixed to the pin 22 placed in the dints 21 of the projection 3b, 3b' of the lever 3, it is kept in the upper position shown by the full line without interfering with the free rotation of the throttle lever 1.

When the acceleration pedal is released, the throttle lever 1 returns by the tension of the main spring 2 to the closed position (B) in a manner similar to the first embodiment.

In cases where the main return spring 2 is broken, thus losing tension, the spring attaching lever 3 rotates counterclockwise with the pin 11' as a center by the downward pull of the spring 24, and thus the pin 22 together with the hook shaped end of the rod 23 slips off the dints 21 of the lever 3 and 3'. The connecting rod 23 then moves to the position shown by the dotted line where the lower part of the upper hook contacts the bottom of the spring shoe 25 by the action of the spring 24 as is shown by the dotted line, consequently turning the lever 5 counterclockwise, and the dent 5' provided at one end of the lever 5 pushing the throttle lever 1 around to the fully closed position (B) of the throttle lever. The functioning of the auxiliary return spring assembly when the acceleration pedal 7 is depressed in this state is the same as in the first embodiment, the explanation of which is omitted here.

As is clear from the above description, the present invention provides a safety device for controlling a carburetor throttle valve in a wire type acceleration system whereby the throttle valve can be fully closed by means of an auxiliary return spring in case the main return spring is broken, and when the main return spring is normal, the auxiliary return spring has no adverse effect on the depressing of the acceleration pedal, as it has less tension than the main return spring.

Although the present invention has been fully described by way of example with reference to the attached drawings, it is to be noted that various changes and modifications are apparent to those skilled in the art. For example, in the first embodiment, when the connecting rod moves down to the lower part of the guide slot, a micro switch may be linked to give warnings to the driver by means of a buzzer of lamp. Therefore, unless otherwise such changes and modifications depart from the scope of the present invention, they should be construed as included therein.

What is claimed is:

1. A safety device for controlling a carburetor throttle valve coupled to a throttle shaft, comprising:
    a throttle lever rigidly fixed to said throttle shaft to rotate integrally therewith;
    a spring attaching lever rotatably attached to a carburetor body and having a larger projection at one end and a smaller projection at the other end, said larger projection having more weight than said smaller projection in respect of a rotatable center point of said spring attaching lever;
    a main return spring connected to said larger projection of said spring attaching lever and said throttle lever and giving both an inward tension;
    an auxiliary throttle lever rotatably attached to said throttle shaft;
    a bracket with a guide slot rigidly attached to said carburetor body;
    a connecting rod having one end rotatably attached to said auxiliary throttle lever, and the other end being bent and placed on an upper edge of said smaller projection of said spring attaching lever and received movably within said guide slot of said bracket;
    an auxiliary return spring having one end fixed to said bracket and the other end mounted on said bent end of said connecting rod, and giving an inward pull between the two points; and
    a stopper rigidly attached to said bracket under a lower edge of said larger projection of said spring attaching lever to limit further rotation.

2. A safety device for controlling a carburetor throttle valve coupled to a throttle shaft, comprising:
    a throttle lever rigidly fixed to said throttle shaft to rotate integrally therewith;
    a pair of spring attaching levers rotatably attached to a carburetor body and each having a larger projection at one end and a smaller projection at the other end having dints on an upper edge, said larger projection having more weight than said smaller projection in respect of a rotatable center point of said spring attaching lever;
    a main return spring connected to said larger projections of said spring attaching levers and said throttle lever and giving both an inward tension;
    an auxiliary throttle lever rotatably attached to said throttle shaft;
    a connecting rod having one end rotatably attached to said auxiliary throttle lever, and the other end being hook shaped and placed on a pin mounted on dints formed on said smaller projections of said spring attaching lever;

3. A safety device for controlling a carburetor throttle valve as claimed in claim 2, wherein said lower spring shoe is secured to the lower part of said connecting rod by means of a collar and a retaining plate.

* * * * *

UNITED STATES PATENT AND TRADEMARK OFFICE
CERTIFICATE OF CORRECTION

PATENT NO. : 3,910,134
DATED : October 7, 1975
INVENTOR(S) : Toshimichi Akagi

It is certified that error appears in the above—identified patent and that said Letters Patent are hereby corrected as shown below:

Claim 2, after the last line, insert the following:

-- a bracket rigidly attached to said carburetor body;

a pair of upper and lower cup shaped spring shoes, each of said spring shoes having a hole at a bottom center and said connecting rod extending therethrough, the upper one of said spring shoes rigidly fixed to said bracket and the other secured at a lower portion of said connecting rod;

an auxiliary return spring surrounding part of said connecting rod in spaced relation, both ends of said auxiliary return spring housed by said spring shoes; and a stopper rigidly attached to said bracket under a lower edge of said larger projection of said spring attaching lever to limit further rotation. --

Signed and Sealed this tenth Day of February 1976

[SEAL]

Attest:

RUTH C. MASON
Attesting Officer

C. MARSHALL DANN
Commissioner of Patents and Trademarks